United States Patent
Bardin et al.

(10) Patent No.: US 6,349,244 B1
(45) Date of Patent: Feb. 19, 2002

(54) COOLER INVENTORY MANAGEMENT SYSTEM

(75) Inventors: James R. Bardin, Atlanta; Jason E. Allen, Powder Springs, both of GA (US)

(73) Assignee: The Coca-Cola Company, Atlanta, GA (US)

(*) Notice: Subject to any disclaimer, the term of this patent is extended or adjusted under 35 U.S.C. 154(b) by 0 days.

(21) Appl. No.: 09/329,084

(22) Filed: Jun. 9, 1999

(51) Int. Cl.$^7$ .............................................. G06F 17/00
(52) U.S. Cl. .................... 700/231; 700/236; 221/108
(58) Field of Search ............................... 700/228, 231, 700/236, 241, 244; 221/108, 109

(56) References Cited

U.S. PATENT DOCUMENTS

| | | | |
|---|---|---|---|
| 3,884,386 A | 5/1975 | Urcola .......................... 221/7 |
| 4,075,463 A | 2/1978 | Yurramendi Eguizabal .. 235/92 |
| 4,303,179 A | * 12/1981 | Spring ..................... 221/109 X |
| 4,639,875 A | 1/1987 | Abraham et al. ............ 364/479 |
| 4,891,755 A | 1/1990 | Asher .......................... 364/406 |
| 4,961,533 A | 10/1990 | Teller et al. ............. 177/25.19 |
| 5,091,713 A | 2/1992 | Horne et al. ................. 340/541 |
| 5,159,560 A | 10/1992 | Newell et al. ............... 364/479 |
| 5,533,079 A | 7/1996 | Colburn et al. ................. 377/6 |
| 5,590,809 A | 1/1997 | Prescott et al. ................. 221/1 |
| 5,671,362 A | 9/1997 | Cowe et al. ................... 395/228 |
| 5,706,976 A | 1/1998 | Purkey ............................ 221/6 |
| 5,728,999 A | * 3/1998 | Teicher .................... 235/381 X |
| 5,745,366 A | 4/1998 | Higham et al. ......... 364/479.12 |
| 5,805,455 A | 9/1998 | Lipps ..................... 364/479.01 |
| 5,812,986 A | 9/1998 | Danelski ....................... 705/22 |
| 5,831,862 A | * 11/1998 | Hetrick et al. ........... 700/236 X |
| 5,930,766 A | * 7/1999 | Gibb ......................... 705/15 X |
| 6,014,594 A | * 1/2000 | Heidel et al. ............... 700/231 |
| 6,029,851 A | * 2/2000 | Jenkins et al. .......... 700/231 X |
| 6,039,467 A | * 3/2000 | Holmes ...................... 700/231 |

\* cited by examiner

Primary Examiner—Christopher P. Ellis
Assistant Examiner—Gene O. Crawford
(74) Attorney, Agent, or Firm—Sutherland Asbill & Brennan LLP

(57) ABSTRACT

An apparatus for tracking the movement of a plurality of products. The apparatus includes a shelf with a plurality of products positioned thereon. The shelf has a first end with an optical sensor positioned thereabout. A controller is functionally connected to the optical sensor so as to track the removal of one of the products from the first end of the shelf and to track the insertion of one of the products into the first end of the shelf.

33 Claims, 6 Drawing Sheets

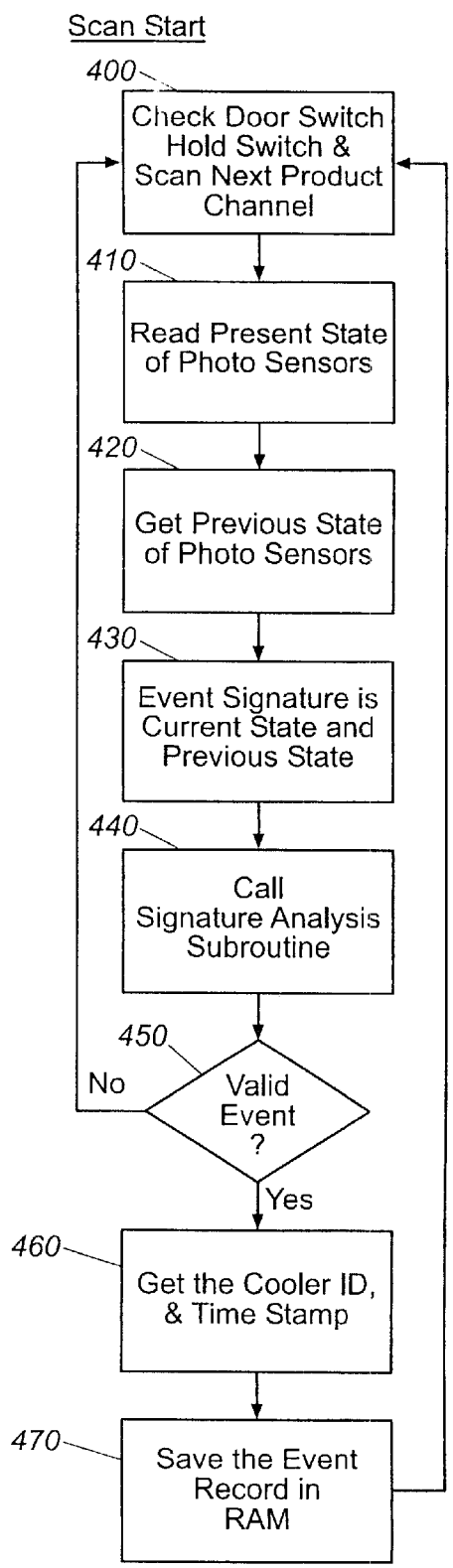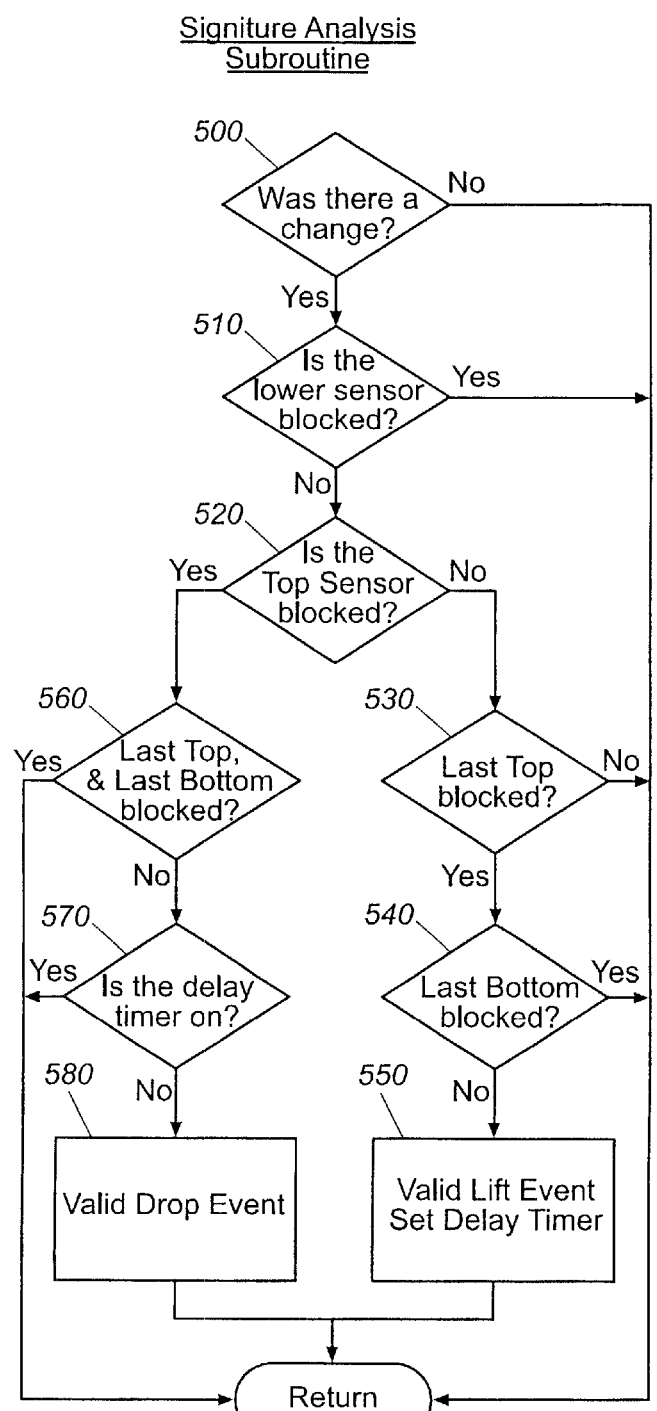
Fig. 5
Fig. 6

| COOLER NUMBER | PRODUCT CHANNEL | EVENT | TIME STAMP |
|---|---|---|---|
| 1 | 21 | Lift | 001 |
| 1 | 21 | Lift | 001 |
| 1 | 7 | Lift | 001 |
| 1 | 8 | Lift | 001 |
| 1 | 1 | Lift | 001 |
| 1 | 32 | Lift | 001 |
| 1 | 3 | Drop Back | 002 |
| 1 | 3 | Lift | 002 |
| 1 | 3 | Lift | 002 |
| 1 | 14 | Lift | 002 |
| 1 | 2 | Lift | 002 |
| 1 | 9 | Drop Back | 002 |
| 1 | 9 | Lift | 002 |
| 1 | 9 | Lift | 002 |
| 1 | 5 | Lift | 002 |
| 1 | 5 | Lift | 002 |
| 1 | 5 | Lift | 002 |

Fig. 9

COOLER INVENTORY MANAGEMENT SYSTEM

TECHNICAL FIELD

The present invention relates generally to systems and methods for tracking product usage and more specifically relates to systems and methods for tracking product inventory from a shelf within a refrigerated cooler.

BACKGROUND OF THE INVENTION

Various methods have been employed in the past to track product usage, purchase, or consumption from dispensing apparatus such as vending machines and the like. Various types of sensors or counters may be used to keep track of the number of products dispensed from such a machine. For example, each "drop" of a bottle, a can, or other item from a vending machine may be tracked. These "smart" vending machines can keep an accurate tally of the amount of product dispensed because the machine is a controlled environment, i.e., the product is not dispensed until the selection button is pushed and the sale is completed.

This type of "smart" technology, however, has not been applicable to track the sale of products merely placed on a store or a cooler shelf. The existing vending machine technology is not directly applicable because a consumer is free to pick up a product, inspect it, take it, or return it to the shelf and make a different selection, i.e., the shelf is not a controlled environment. For example, a consumer may pick up a bottle or can containing a carbonated soft drink off of a shelf and then return that bottle or can and make a different selection. The return of the bottle or can may inflate the number of items actually removed from the shelf if only the removals are counted or monitored.

What is needed therefore is a system and method for tracking the use, purchase, or consumption of items placed on a shelf. The system and method must be able to keep track of removals and additions to the shelf. Further, these systems and methods must be implemented in consumer friendly and/or otherwise non-obtrusive manner.

SUMMARY OF THE INVENTION

The present invention provides an apparatus for tracking the movement of a plurality of products. The apparatus includes a shelf with a plurality of products positioned thereon. The shelf has a first end with an optical sensor positioned thereabout. A controller is functionally connected to the optical sensor so as to track the removal of one of the products from the first end of the shelf and to track the insertion of one of the products into the first end of the shelf.

Specific embodiments of the present invention include the use of a gravity-assisted product slide with a plurality of products positioned therein and the use of optical sensors having one or more emitters and one or more receivers. The emitters are positioned on a first side of the shelf and the receivers are positioned on a second side of the shelf. The emitters may be positioned along a diagonal line with respect to each other. The receivers are positioned on the second side of the shelf in alignment with each of the receivers.

A lower one of the emitters and a lower one of the receivers form a lower optical pair while an upper one of the emitters and an upper one of the receivers form an upper optical pair. The upper optical pair and the lower optical pair are blocked when one of the products is adjacent to the first end of the shelf. The upper optical pair is blocked and the lower optical pair is open when one of the products is being removed from the shelf. The upper optical pair is open and the lower optical pair is open after the product has been removed from the shelf. The upper optical pair is open and the lower optical pair is open when one of the products is being inserted into the shelf. The upper optical pair is then blocked and the lower optical pair is open as the product continues to be inserted into the shelf.

A further embodiment of the present invention provides for an apparatus for tracking the movement of a plurality of products. The apparatus includes a gravity-assisted product slide with a plurality of products positioned therein. The slide includes a first end, a lower part of the first end, and an upper part of the first end. A lower optical sensor is positioned about the lower part of the first end of the slide while an upper optical sensor is positioned about the upper part of the first end of the slide. A controller is functionally connected to the lower optical sensor and to the upper optical sensor so as to track the removal of one of the products from the first end of the slide and to track the insertion of one of the products to the first end of the slide.

The upper optical pair and the lower optical pair are blocked when one of the products is adjacent to the first end of the slide. The upper optical pair is blocked and the lower optical pair is open when one of the products is being removed from the slide. The upper optical pair is open and the lower optical pair is open after the product has been removed from the slide. The upper optical pair is open and the lower optical pair is open when one of the products is being inserted into the slide. The upper optical pair is then blocked and the lower optical pair is open as the product continues to be inserted into the slide.

The method of the present invention provides for tracking the number of products on a product slide. The method includes the steps of positioning a first optical sensor along a first part of the product slide, positioning a second optical sensor along a second part of the product slide, and monitoring when the first optical sensor and the second optical sensor change state. The method may further include the steps of determining when the products are removed from the product slide and when the products are inserted into the product slide based upon the change of state. The monitoring step may include determining whether the first optical sensor and the second optical sensor are blocked or open.

The determining step includes a removal of one of the products from the product slide when the monitoring step finds that the first optical sensor is blocked and the second optical sensor is open in a first state and that the first optical sensor is open and the second optical sensor is open in a second state. The determining step includes an insertion of one of the products into the product slide when the monitoring step finds that the first optical sensor is open and the second optical sensor is open in a first state and that the first optical sensor is blocked and the second optical sensor is open in a second state.

Other objects, features, and advantages of the present invention will become apparent upon review of the following detailed description of the preferred embodiments of the present invention when taken in conjunction with the drawings and the appended claims.

BRIEF DESCRIPTION OF THE DRAWINGS

FIG. 5 is a flow chart of the single tray event recognition logic.

FIG. 6 is a flow chart of the signature analysis subroutine.

FIG. 9 is a sample spreadsheet layout.

DETAILED DESCRIPTION OF THE INVENTION

Figure 1:
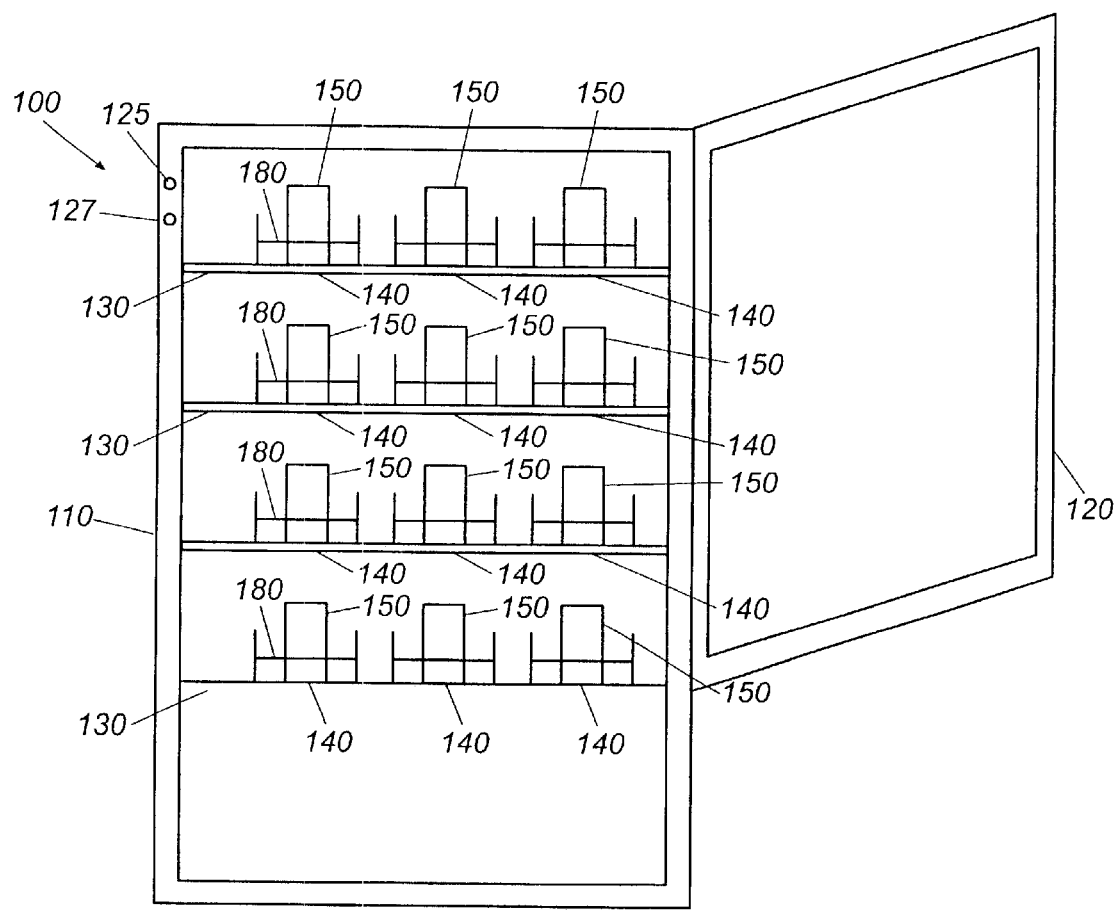
FIG. 1 is a diagrammatic representation of a refrigerated cooler.
Figure 2A:
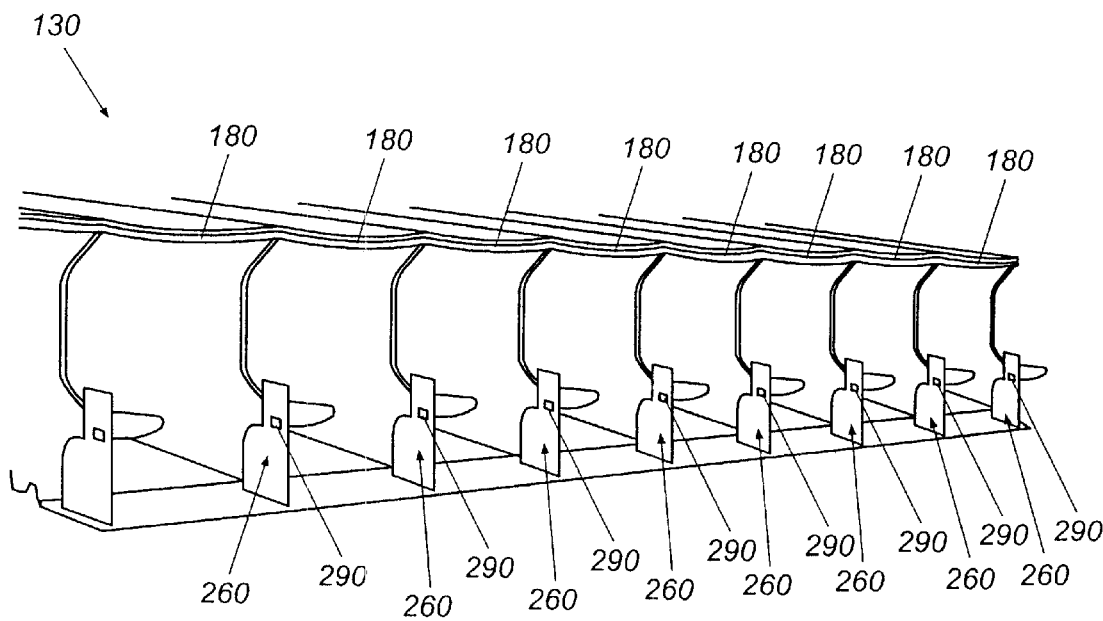
FIG. 2A is a perspective view of a multi-channel dispensing slide for use in the refrigerated cooler.
Figure 2B:
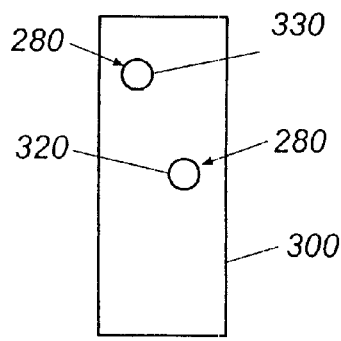
FIG. 2B is a plan view of the emitters.
Figure 2C:
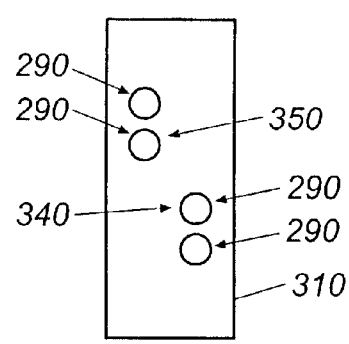
FIG. 2C is a plan view of the receivers.
Figure 3:
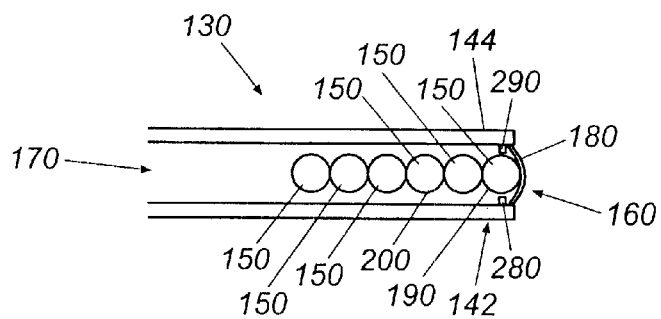
FIG. 3 is a plan view of one channel of the multi-channel dispensing slide.

Referring now in more detail to the drawings, in which like numerals refer to like parts throughout the several views, FIGS. 1–3 show a refrigerated cooler 100 for use with the present invention. The refrigerated cooler 100 is of conventional design. The cooler 100 may include an insulated shell 110 and an outer door 120. The outer door 120 preferably is transparent in whole or in part such that the consumer can see within the cooler 100. The use of the door 120 is not required. The cooler 100 generally has a mechanical refrigeration system (not shown) of conventional design. A preferred cooler 100 is manufactured by the Beverage-Air Company of Spartanburg, S.C. under the mark MT-27 ("Marketeer"). The shell 110 and/or the door 120 also may have a contact switch 125 such that a determination can be made whether the door 120 is open or closed so as to trigger the present invention.

Located within the cooler 100 may be a plurality of shelves 130. Any type of shelf 130 may be used. The shelves 130 are preferably, but not necessarily, gravity feed organizers such as the shelves 130 sold under the mark "Visi-Slide" by Display Technologies of New York, N.Y. Other alternatives would include the use of neck-tracker shelves that hold a bottle by its neck or a horizontal serpentine design.

The shelves 130 each preferably have a plurality of channels 140 therein. A plurality of products 150 is placed within each of the channels 140. Each channel 140 has a first end 160 near the door 120 and a second end 170 near the rear of the cooler 100. The second end 170 is generally elevated somewhat from the first end 160. In this fashion, the products 150 will slide under the force of gravity towards the first end 160 of the channel 140 towards the door 120. The first end 160 of the channel 140 preferably has a barrier 180 such that the products 150 do not fall out of the channel 140. When a first product 190 is removed from the first end 160 of the channel 140, a second product 200 then slides into place adjacent to the barrier 180 on the first end 160 of the channel 140. The channels 140 are preferably made from aluminum, stainless steel, other metals, plastic, vinyl-coated wire, or other types of substantially non-corrosive materials or combinations thereof.

The present invention provides for the use of a tracking system 250 within the cooler 100. The tracking system 250 includes a plurality of optical sensors 260 used in conjunction with a micro-controller 270. The optical sensor 260 may be a conventional photoelectric sensor using an infrared (IR) emitter 280 and one or more receivers 290. Specifically, a combination of Light Emitting Diodes (LEDs) and Light Receiving Phototransistors (LRPs) may be used. The optical sensors 260 may be supplied by Touch Controls, Inc. of Fallbrook, Calif. Other types of sensing devices may be used, such as other types of conventional mechanical, electrical, or optical sensors. The micro-controller 270 may be a conventional processing unit. Depending upon the number of optical sensors 260 used, a conventional multiplex card 275 may be used.

Each channel 140 may have a first post 300 positioned on a first side 142 of the channel 140 and a second post 310 35 positioned on the opposing side or a second side 144 of the channel 140. The posts 300, 310 are positioned on the first end 160 of the channel 140 near the barrier 180. Positioned on the first post 300 may be a lower emitter 320 and an upper emitter 330. The emitters 320, 330 are spaced from each other and may be positioned either vertically on top of each other or along a diagonal as is shown in FIG. 2B. The use of the diagonal alignment is useful when the product 150 is, for example, in the shape of a contoured bottle. If the emitters 320, 330 are positioned along a substantially vertical line, the contours of the bottle may cause a false reading. Further, a false reading also may be caused if the emitters 320, 330 are positioned along the vertical line and the product 150 is tipping or leaning as it moves. The use of the diagonal alignment therefore is helpful in tracking the movement of the product 150. This movement may be the up and down motion as the product 150 is being removed from or placed within the channel 140 or the sliding motion as the product 150 slides along the channel 140.

Positioned on the second post 310 may be one or more lower receivers 340 and one or more upper receivers 350. More than one receiver 290 may be used with each emitter 380. Preferably, two receivers 340, 350 are used with each emitter 320, 330. The receivers 340, 350 are positioned on the second post 310 in alignment with the emitters 320, 330. The lower receivers 340 will receive the IR beam from the lower emitter 320 and the upper receivers 350 will receive the IR beam from the upper emitter 330.

The relative position of the emitters 320, 330 and the receivers 340, 350 described herein are by way of example only. For example, one emitter 320, 330 may be on the first post 300 while another emitter 320, 330 may be on the second post 310, or vise versa, with the receivers 340, 350 in corresponding locations. The emitters 320, 330 and the receivers 340, 350 may use a signal filtering method due to the lighting within the cooler 100 or due to ambient lighting. A conventional phase lock loop circuit or similar methods may be used to distinguish the background lighting from the light transmitted by the emitters 320, 330.

Figure 4:
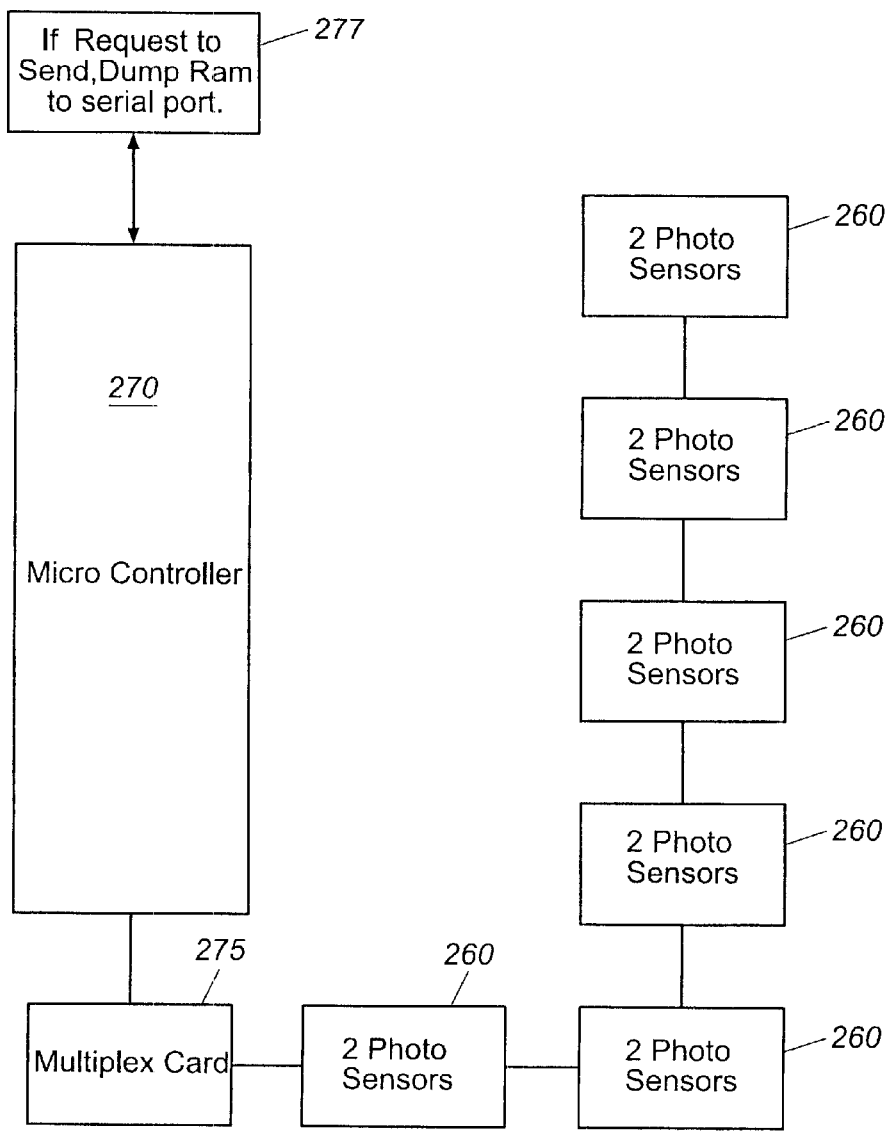
FIG. 4 is a schematic showing the controller and the optical sensors.

As is shown in FIG. 4, the emitters 320, 330 and the receivers 340, 350 create a circuit with the micro-controller 270 and the multiplex card 275. The emitters 320, 330 and the receivers 340, 350 are generally positioned near the barrier 180 such that the first product 190 blocks the respective beams when the first product 190 is resting against the barrier 180. The contact switch 125 of the door 120 also may be connected within the circuit to the micro-controller 270. A hold switch or a reset switch 127 also may be used. The hold switch 127 may prevent the operation of the tracking system 250 during, for example, restocking of the cooler 100 with the product 150.

FIG. 5 shows a flow chart of the event recognition or the "scan" logic for use in a single channel 140 of a cooler 100. As is shown therein at step 400, the micro-controller 270 checks the door switch 125 (only is a door 120 is used), the hold switch 127, and then scans the next product channel 140. If the door switch 125 indicates that the door 120 to the cooler 100 is closed, there is no need to go any further because a consumer cannot remove or replace the product 150 if the door 120 is closed. Likewise, if the hold switch 127 is activated, the micro-controller 270 will not proceed. If the door 120 is open and the hold switch 122 is not activated, the micro-controller 270 will select the appropriate channel 140.

At step 410, the micro-controller 270 reads the present state of the optical sensors 260. The available states include:

(1) the lower emitter 320 and the lower receiver 340 are blocked and the upper emitter 330 and the upper receiver 350 are blocked;

(2) the lower emitter 320 and the lower receiver 340 are open and the upper emitter 330 and the upper receiver 350 are open;

(3) the lower emitter 320 and the lower receiver 340 are blocked and the upper emitter 330 and the upper receiver 350 are open; and (4) the lower emitter 320 and the lower receiver 340 are open and the upper emitter 330 and the upper receiver 350 are blocked.

At step 420, the micro-controller 270 obtains the previous state of the optical sensors 260. The possible states of the optical sensors 260 are the same as those as described above. At step 430, an event signature is created containing the current state and the previous state of the optical sensors 260. At step 440, a signature analysis sub-routine is retrieved. The signature analysis sub-routine is described in detail below at FIG. 6. After the signature analysis sub-routine is completed, a determination of whether a valid event has taken place is made at step 450. A valid event would be a "lift", i.e., removing the first product 190 or a "drop", i.e., replacing the first product 190. If a valid event has taken place, the micro-controller 270 obtains the cooler identification number and the current time. The combination of the event, the cooler identification, and the time stamp forms an event record. In step 470, this event record is stored in RAM 277 or other type of memory.

FIG. 6 shows the signature analysis sub-routine. At step 500, the micro-controller 270 determines whether or not a change of state has taken place. If so, at step 510 the micro-controller 270 determines whether or not the lower emitter 320 and the lower receiver 340 are blocked. If so, the signature analysis sub-routine returns to the scan routine of FIG. 5. If not, the micro-controller 270 next determines whether the upper emitter 330 and the upper receiver 350 are blocked at step 520. If the upper emitter 330 and the upper receiver 350 are open, the micro-controller 270 determines whether the lower emitter 320 and the lower receiver 340 in the previous state were blocked. If not, the micro-controller 270 returns to the scan routine of FIG. 5. If so, at step 540 the micro-controller 270 determines whether the lower emitter 320 and the lower receiver 340 were blocked in the previous state. If so, micro-controller 270 returns to the scan routine of FIG. 5. If not, at step 550, the micro-controller 270 determines that a valid lift event has occurred and sets the delay timer within the micro-controller 270. The length of time used by the delay timer is determined such that the lift event can be competed before another scan routine takes place. The micro-controller 270 then returns to the scan routine of FIG. 5.

If at step 520 the micro-controller 270 determines that the upper emitter 330 and the upper receiver 350 are blocked, the micro-controller 270 proceeds to step 560. At step 560, the micro-controller 270 determines whether the lower emitter 320 and the lower receiver 340 as well as the upper emitter 330 and the upper receiver 350 were blocked in the previous state. If so, the micro-controller 270 returns to the scan routine of FIG. 5. If not, at step 570 the micro-controller 270 determines whether the delay timer is on. If so, the micro-controller 270 returns to the scan routine of FIG. 5. If not, at step 580 the micro-controller 270 determines that a valid drop event has taken place. The micro-controller 270 then returns to the scan routine of FIG. 5.

Figure 7A:
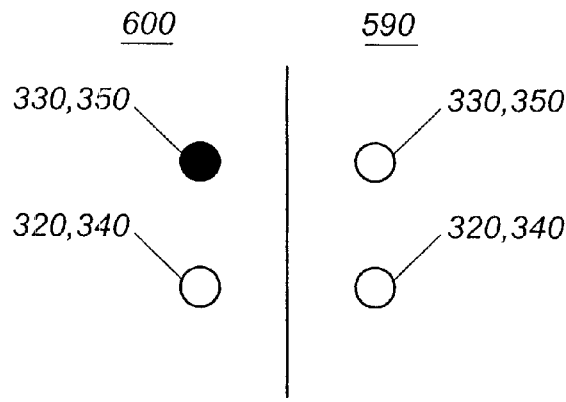
FIG. 7A is a chart showing the various event states of the present invention for a lift event.
Figure 7B:
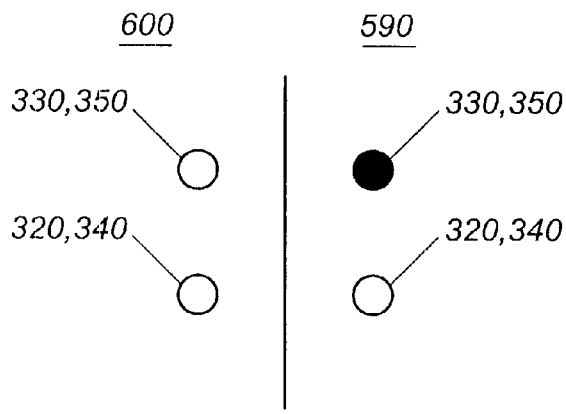
FIG. 7B is a chart showing the various event states of the present invention for a drop event.

FIGS. 7A and 7B are diagrammatic representations of the changes of state of the emitters 320, 330 and the receivers 340, 350. In FIG. 7A, a valid lift event is shown. The emitters 320, 330 and the receivers 340, 350 are both open in the present state 590 while the upper emitter 330 and the upper receiver 350 are blocked and the lower emitter 320 and the lower receiver 340 are open in the previous state 600. In this case, the optical sensors 260 determine that the first product 190 was being lifted out of the channel 140 by the fact that the lower emitter 320 and the lower receiver 340 are open but the upper emitter 330 and the upper receiver 350 were blocked in the previous state 600. This removal of the first product 190 is then completed in the present state 590 when both pairs of emitters 320, 330 and the receivers 340, 350 are open. The micro-controller 270 then sets the delay timer so as to permit the first product 190 to be completely removed from the channel 140 and for the second product 200 to slide into place against the barrier 180 by the force of gravity.

Likewise, in FIG. 7B a valid drop event is shown. The present state 590 shows that the upper emitter 330 and the upper receiver 350 are blocked while the lower emitter 320 and the lower receiver 340 are opened. In the previous state 600, both pairs of the emitters 320, 330 and the receivers 340, 350 are open. This means that the emitters 320, 330 and the receivers 340, 350 were open in the previous state 600 because either there was no first product 190 within the channel 140 or that the first product 190 was being inserted into the channel 140 and the second product 200 was being pushed back towards the second end 170 of the channel 140. In either case, the emitters 320, 330 and the receivers 340, 350 were open. As the first product 190 is being placed within the channel 140 in the present state 590, the upper emitter 330 and the upper receiver 350 are blocked while the lower emitter 320 and the lower receiver 340 are still open.

Figure 8:
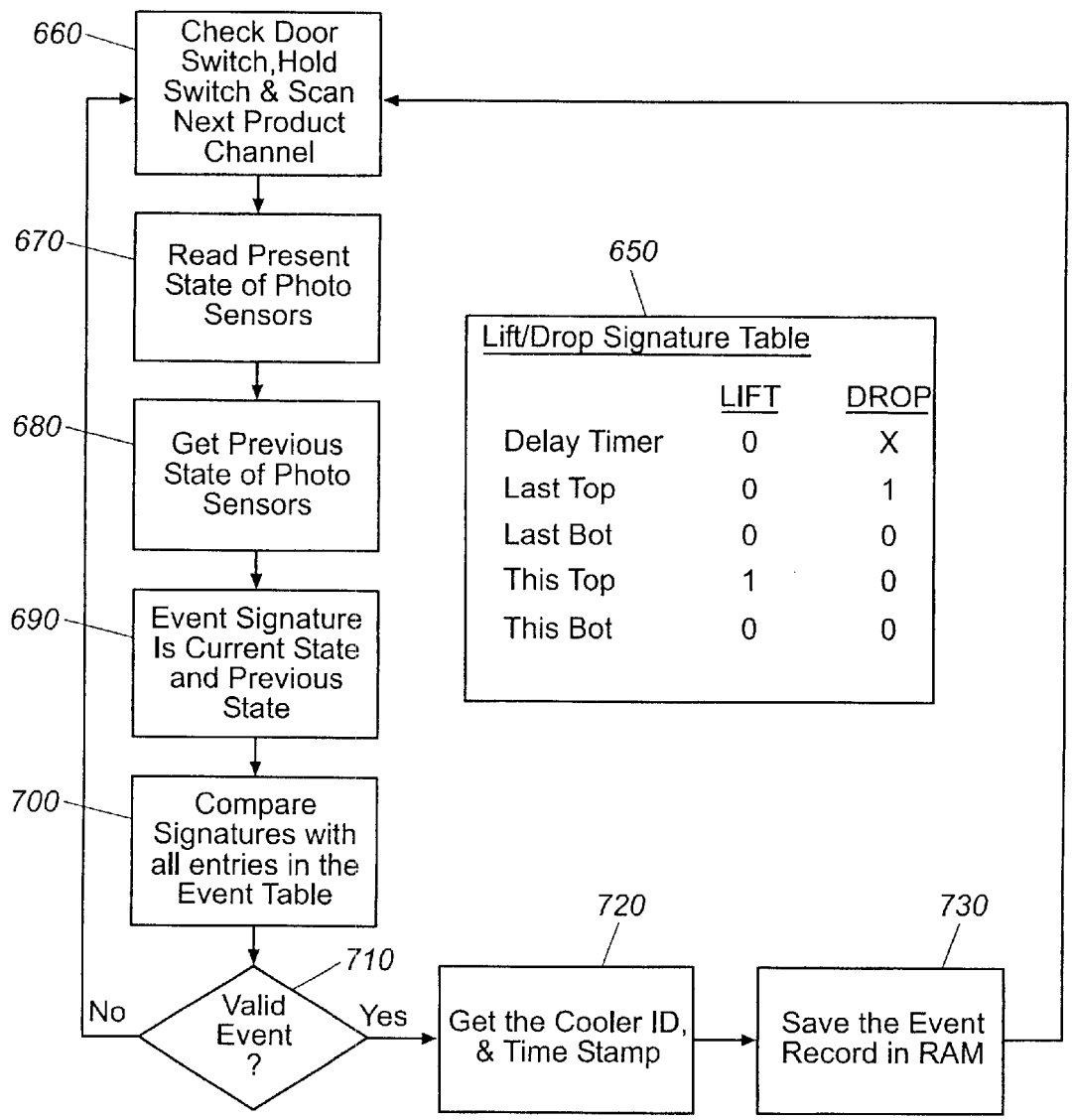
FIG. 8 is a flow chart of a single shelf scan diagram with a signature table.

FIG. 8 shows an alternative scan routine to that found in FIG. 5, but with the use of a lift/drop signature table 650 instead of the signature analysis sub-routine of FIG. 6. The signature table 650 provides the same analysis as in the signature analysis subroutine but in table form. If the micro-controller 270 determines (1) that the delay timer is not on, (2) that the upper emitter 330 and the upper receiver 350 were open in the previous state, (3) that the lower emitter 320 and the lower receiver 340 were open in the previous state, (4) that the upper emitter 330 and the upper receiver 350 are closed in the present state, and (5) that the lower emitter 320 and the lower receiver 340 are closed in the present state, then a lift event has occurred. Likewise, if the micro-controller 270 determines that (1) the upper emitter 330 and the upper receiver 350 were closed in the previous state, (2) that the lower emitter 320 and the lower receiver 340 were open in the previous state, (3) that the upper emitter 330 and the upper receiver 350 are open in the present state, and (4) that the lower emitter 320 and the lower receiver 340 are open in the present state, then a drop event has occurred.

Applying the use of the signature table 650 in FIG. 8, the micro-controller 270 checks the door switch 125 (if a door 120 is used), the hold switch 127, and selects the next product channel 140 at step 660. At step 670, the micro-controller 270 reads the present state of the optical sensors 260. At step 680, the micro-controller 270 retrieves the previous state of the optical sensors 260. At step 690, an event signature is created with the current state and the previous state of the optical sensors 260. At step 700, the signature table 650 is compared with the event signature of step 690. At step 710, the micro-controller 270 determines whether a valid event has taken place, i.e., a lift or a drop. If so, at step 720, the micro-controller 270 obtains the cooler identification number and the time stamp so as to create an event record. At step 730, the event record is stored in RAM 277 or other type of memory device.

The event records may be accessed at any time. The event records may be organized in a conventional spreadsheet format. FIG. 9 shows a sample spreadsheet layout 750. As is shown, the spreadsheet layout 750 includes the cooler identification number 760, the channel number 770, the event 780, i.e., either a lift or a drop, and the time stamp 790. A preferred spreadsheet 750 may be the Excel® spreadsheet software sold by the Microsoft Corporation of Redmond, Wash. The data may be downloaded to a standard laptop computer, palmtop, or similar device via a serial port such as a RS232 port. Alternatively, the data may be transmitted via radio frequencies, telephone, or other conventional means.

The present invention thus provides an accurate means for monitoring the inventory of a cooler or other type of product shelf. Further, the present invention also may provide consumer purchasing information in that the nature of the products bought, the volume, and even the time the products are bought may be available. This type of data may be used to determine brand and packaging information and optimization.

It should be apparent that the foregoing relates only to the preferred embodiments of the present invention and that numerous changes and modifications may be made herein without departing from the spirit and scope of the invention as defined by the following claims.

We claim:

1. An apparatus for tracking the movement of a plurality of products, comprising:
    a shelf;
    said plurality of products positioned on said shelf;
    said shelf comprising a first end;
    each of said plurality of products being accessible through said first end without restriction;
    an optical sensor positioned about said first end of said shelf; and
    a controller functionally connected to said optical sensor so as to track the removal of one of said plurality of products from said first end of said shelf and to track the insertion of one of said plurality of products into said first end of said shelf.

2. The apparatus for tracking the movement of a plurality of products of claim 1, wherein said shelf comprises a gravity-assisted product slide.

3. The apparatus for tracking the movement of a plurality of products of claim 1, wherein said optical sensor comprises one or more emitters and one or more receivers.

4. The apparatus for tracking the movement of a plurality of products of claim 3, wherein said shelf comprises a first side and a second side.

5. The apparatus for tracking the movement of a plurality of products of claim 4, wherein said one or more emitters are positioned on said first side of said shelf and said one or more receivers are positioned on said second side of said shelf.

6. The apparatus for tracking the movement of a plurality of products of claim 5, wherein said one or more emitters comprise two emitters and wherein said two emitters are positioned along a diagonal line with respect to each other on said first side of said shelf.

7. The apparatus for tracking the movement of a plurality of products of claim 5, wherein a lower one of said one or more emitters is positioned on a lower end of said first side of said shelf and wherein a lower one of said one or more receivers is positioned on a lower end of said second side of said shelf, said lower emitter and said lower receiver comprising a lower optical pair.

8. The apparatus for tracking the movement of a plurality of products of claim 7, wherein an upper one of said one or more emitters is positioned on an upper end of said first side of said shelf and wherein an upper one of said one or more receivers is positioned on an upper end of said second side of said shelf, said upper emitter and said upper receivers comprising an upper optical pair.

9. The apparatus for tracking the movement of a plurality of products of claim 8, wherein said upper optical pair and said lower optical pair are blocked when said one of said plurality of products is adjacent to said first end of said shelf.

10. The apparatus for tracking the movement of a plurality of products of claim 8, wherein said upper optical pair is blocked and said lower optical pair is open when said one of said plurality of products is being removed from said shelf.

11. The apparatus for tracking the movement of a plurality of products of claim 10, wherein said upper optical pair is open and said lower optical pair is open after said one of said plurality of products has been removed from said shelf.

12. The apparatus for tracking the movement of a plurality of products of claim 8, wherein said upper optical pair is open and said lower optical pair is open when said one of said plurality of products is being inserted into said shelf.

13. The apparatus for tracking the movement of a plurality of products of claim 12, wherein said upper optical pair is blocked and said lower optical pair is open when said one of said plurality of products is being inserted into said shelf.

14. An apparatus for tracking the movement of a plurality of products, comprising:
    a gravity-assisted product slide;
    said plurality of products positioned within said slide;
    said slide comprising a first end, a lower part of said first end, and an upper part of said first end;
    each of said plurality of products being accessible through said first end without restriction;
    a lower optical sensor positioned about said lower part of said first end of said slide;
    an upper optical sensor positioned about said upper part of said first end of said slide; and
    a controller functionally connected to said lower optical sensor and to said upper optical sensor so as to track the removal of one of said plurality of products from said first end of said slide and to track the insertion of one of said plurality of products into said first end of said slide.

15. The apparatus for tracking the movement of a plurality of products of claim 14, wherein said upper optical sensor and said lower optical sensor are blocked when said one of said plurality of products is adjacent to said first end of said slide.

16. The apparatus for tracking the movement of a plurality of products of claim 14, wherein said upper optical sensor is blocked and said lower optical sensor is open when said one of said plurality of products is being removed from said slide.

17. The apparatus for tracking the movement of a plurality of products of claim 16, wherein said upper optical sensor is open and said lower optical sensor is open after said one of said plurality of products has been removed from said slide.

18. The apparatus for tracking the movement of a plurality of products of claim 14, wherein said upper optical sensor is open and said lower optical sensor is open when said one of said plurality of products is being inserted into said slide.

19. The apparatus for tracking the movement of a plurality of products of claim 18, wherein said upper optical pair is blocked and said lower optical pair is open when said one of said plurality of products is being inserted into said slide.

20. A method for tracking a number of products on a product slide, comprising the steps of:
   positioning a first optical sensor along a first part of said product slide;
   positioning a second optical sensor along a second part of said product slide;
   positioning said number of products on said product slide;
   each of said number of products being accessible between said first part and said second part without restriction;
   monitoring when said first optical sensor and said second optical sensor change state;
   said monitoring step comprises determining whether said first optical sensor and said second optical sensor are blocked or open; and
   determining when said products are removed from said product slide and when said products are inserted into said product slide based upon said change of state.

21. The method for tracking the number of products on a product slide of claim 20, wherein said monitoring step comprises said first optical sensor being blocked and said second optical sensor being open in a first state.

22. The method for tracking the number of products on a product slide of claim 21, wherein said monitoring step comprises said first optical sensor being open and said second optical sensor being open in a second state.

23. The method for tracking the number of products on a product slide of claim 22, wherein said determining step comprises a removal of one of said products from said product slide.

24. The method for tracking the number of products on a product slide of claim 20, wherein said monitoring step comprises said first optical sensor being open and said second optical sensor being open in a first state.

25. The method for tracking the number of products on a product slide of claim 24, wherein said monitoring step comprises said first optical sensor being blocked and said second optical sensor being open in a second state.

26. The method for tracking the number of products on a product slide of claim 25, wherein said determining step comprises an insertion of one of said products into said product slide.

27. A method for tracking a number of products on a product slide, comprising the steps of:
   positioning a first optical sensor along a first part of said product slide;
   positioning a second optical sensor along a second part of said product slide;
   positioning said number of products on said product slide;
   each of said number of products being accessible between said first part and said second part without restriction;
   monitoring when said first optical sensor and said second optical sensor are blocked or open; and
   determining when said products are removed from between said first part and said second part of said product slide and when said products are inserted between said first part and said second part of said product slide based said monitoring step.

28. The method for tracking the number of products on a product slide of claim 27, wherein said monitoring step comprises said first optical sensor being blocked and said second optical sensor being open in a first state.

29. The method for tracking the number of products on a product slide of claim 28, wherein said monitoring step comprises said first optical sensor being open and said second optical sensor being open in a second state.

30. The method for tracking the number of products on a product slide of claim 29, wherein said determining step comprises a removal of one of said products from said product slide.

31. The method for tracking the number of products on a product slide of claim 29, wherein said monitoring step comprises said first optical sensor being open and said second optical sensor being open in a first state.

32. The method for tracking the number of products on a product slide of claim 31, wherein said monitoring step comprises said first optical sensor being blocked and said second optical sensor being open in a second state.

33. The method for tracking the number of products on a product slide of claim 32, wherein said determining step comprises an insertion of one of said products into said product slide.

* * * * *